May 14, 1935.　　　　H. L. PELZER　　　　2,001,313
ART OF CRACKING HYDROCARBON OILS
Filed Feb. 19, 1929　　　7 Sheets-Sheet 4

Fig. 4.

INVENTOR
Harry L. Pelzer
BY
ATTORNEYS

Patented May 14, 1935

2,001,313

UNITED STATES PATENT OFFICE 2,001,313

ART OF CRACKING HYDROCARBON OILS

Harry L. Pelzer, Highland, Ind., assignor to Sinclair Refining Company, New York, N. Y., a corporation of Maine Application February 19, 1929, Serial No. 341,215

10 Claims. (Cl. 196—58)

Petroleum oils as they come from the ground, probably without exception, contain sulphur. The amount of sulphur and the form in which the sulphur is present varies in different oils. The amount of sulphur may vary, for example, from a fraction of one per cent to several per cent on the oil. Sometimes the sulphur is present in a form such that its removal offers no particular difficulties, sometimes in a very refractory form. The removal of sulphur or the conversion of sulphur to an unobjectionable form is one of the important purposes of most refining treatments to which petroleum oil products are usually subjected. In this aspect the sulphur is objectionable because it impairs the quality of the product. Frequently the sulphur is objectionable in another aspect, namely as a cause of corrosion. Cracking operations as commonly carried out usually involve the maintenance of high temperatures and high pressures, and in this latter aspect the presence of sulphur in stocks subjected to cracking operations consequently involves special difficulties because high temperatures tend to accelerate corrosion and high pressures increase the element of danger resulting from corrosion.

This invention relates to improvements in the cracking of heavy sulphur-containing hydrocarbon oils, such as gas oil, crude oil, topped crude oil, fuel oil, by distillation under superatmospheric pressure to produce lighter hydrocarbon oils, such as gasoline.

According to this invention, a desulphurizing agent is supplied to the cracking operation dispersed in raw oil supplied to the cracking operation, or in that part of the raw oil supplied to the cracking operation more objectionable with respect to corrosion. This raw oil including a dispersed desulphurizing agent is passed through a heating zone into a vaporizing zone from which vapors including vapors of the desired distillate product are taken off under superatmospheric pressure and oil free from suspended matter, reaction products of the desulphurization or unconsumed desulphurizing agent or pitch or pitch-like solids or semi-solids formed by the cracking reaction, from the vaporizing zone, is passed through a separate heating zone into the vaporizing zone. In the first mentioned, or primary, heating zone, the raw oil including a desulphurizing agent is heated approximately to the temperature prevailing in the vaporizing zone or to a higher temperature, and with advantage to a cracking temperature, and in the second mentioned, or secondary, heating zone, oil free from suspended matter, from the vaporizing zone, is heated to a cracking temperature. Heat is, with advantage, supplied to both heating zones by the same stream of heating gases, and this stream of heating gases is, with advantage, passed first in heat exchange with the oil passing through the primary heating zone and then in heat exchange with the oil passing through the secondary heating zone, particularly where a relatively high velocity of flow is maintained through the primary heating zone, as described below.

The oil free from suspended matter passed through the secondary heating zone may consist exclusively of condensed higher boiling constituents separated from the vapors taken off from the vaporizing zone or a mixture of such condensed higher boiling constituents and raw oil, particularly raw oil less objectionable with respect to corrosion, or the oil passed through the secondary heating zone may include unvaporized oil from the vaporizing zone from which suspended matter has been separated before it is recirculated through the secondary heating zone.

The raw oil including a dispersed desulphurizing agent is, with advantage, preheated before it is supplied to the primary heating zone. It may, for example, be so preheated by indirect heat exchange with the vapors taken off from the vaporizing zone and undergoing partial condensation. It may, for example, be so preheated by direct heat exchange with the vapors taken off from the vaporizing zone and any condensate produced by this heat exchange supplied to the primary heating zone with the raw oil including a dispersed desulphurizing agent. The vapors taken off from the vaporizing zone may, for example, be subjected to successive partial condensation operations, the raw oil including a dispersed desulphurizing agent introduced directly into either of these operations and the raw oil-condensate mixture from this operation supplied to the primary heating zone and condensate from the other operation supplied to the secondary heating zone. Other raw oil, less objectionable with respect to corrosion, for example, may be introduced directly into the other condensation operation. The raw oil including a dispersed desulphurizing agent may also, for example, be preheated by heat exchange with waste heating gases or in a separate heating furnace before being supplied to the primary heating zone.

The desulphurizing agents useful in carrying out this invention include lime, caustic alkali, alcoholic solutions of caustic alkali, copper oxide or copper silicate gels, finely divided absorbent materials such as fuller's earth carrying dispersed copper salts such as copper chloride. The invention is particularly adapted to utilize finely divided solid desulphurizing agents supplied in suspension in raw oil. The invention is also adapted to utilize liquid or semi-liquid desulphurizing agents supplied in emulsion in raw oil.

The invention has a number of advantages which will appear as the description proceeds. In particular, the invention provides an advantageous method of combating corrosion in the cracking of sulphur-containing hydrocarbon oils by distillation under superatmospheric pressure and is also effective in reducing the sulphur content of the oil products of such operations.

The invention will be further described in connection with the accompanying drawings which illustrate, diagrammatically and conventionally, in elevation and partly in section and with parts broken away, several forms of apparatus adapted for carrying out the process of the invention. It will be understood that the following more detailed description of the invention is intended to exemplify the invention and that the invention can be carried out in other and different forms of apparatus.

Referring to the accompanying drawings.

The pressure still illustrated in each of the figures, except Fig. 5, comprises a vaporizing drum 1, a battery of heating tubes 2, the secondary heating zone, arranged in the heating flue of a heating furnace 3, and another battery of heating tubes 4, the primary heating zone, arranged in the heating flue of the heating furnace 3 in advance of the battery of heating tubes 2. The heating furnace 3 comprises a firebox 5 communicating with the upper end of the heating flue in which the heating tubes are arranged and a stack flue 6 communicating with the lower end of this same heating flue. Blowers 7 are provided for recirculation through the heating flue of part of the escaping heating gases, as described in United States Letters Patent Nos. 1,574,546 and 1,574,547 granted February 23, 1926, to the Sinclair Refining Company on the application of John E. Bell. In a still system comprising a vaporizing drum 1 about 9′ by 30′, the battery of heating tubes 2 may comprise fifty 4″ tubes 20′ long connected in parallel and the battery of heating tubes 4 may comprise twenty-one 4″ tubes 10′ long connected in series. The exact arrangement of the heating tubes in the secondary heating zone is not important; they may, for example, be arranged as illustrated and described in an application filed June 7, 1927, Serial No. 197,035 by me, or these heating tubes also may be connected in series or in series connected groups. The exact arrangement of the heating tubes in the primary heating zone also is not important; however, the heating tubes in the primary heating zone are with advantage arranged to maintain a relatvely high velocity of flow therethrough and in this respect it is advantageous to connect these heating tubes in series or in series connected groups.

Figure 1:
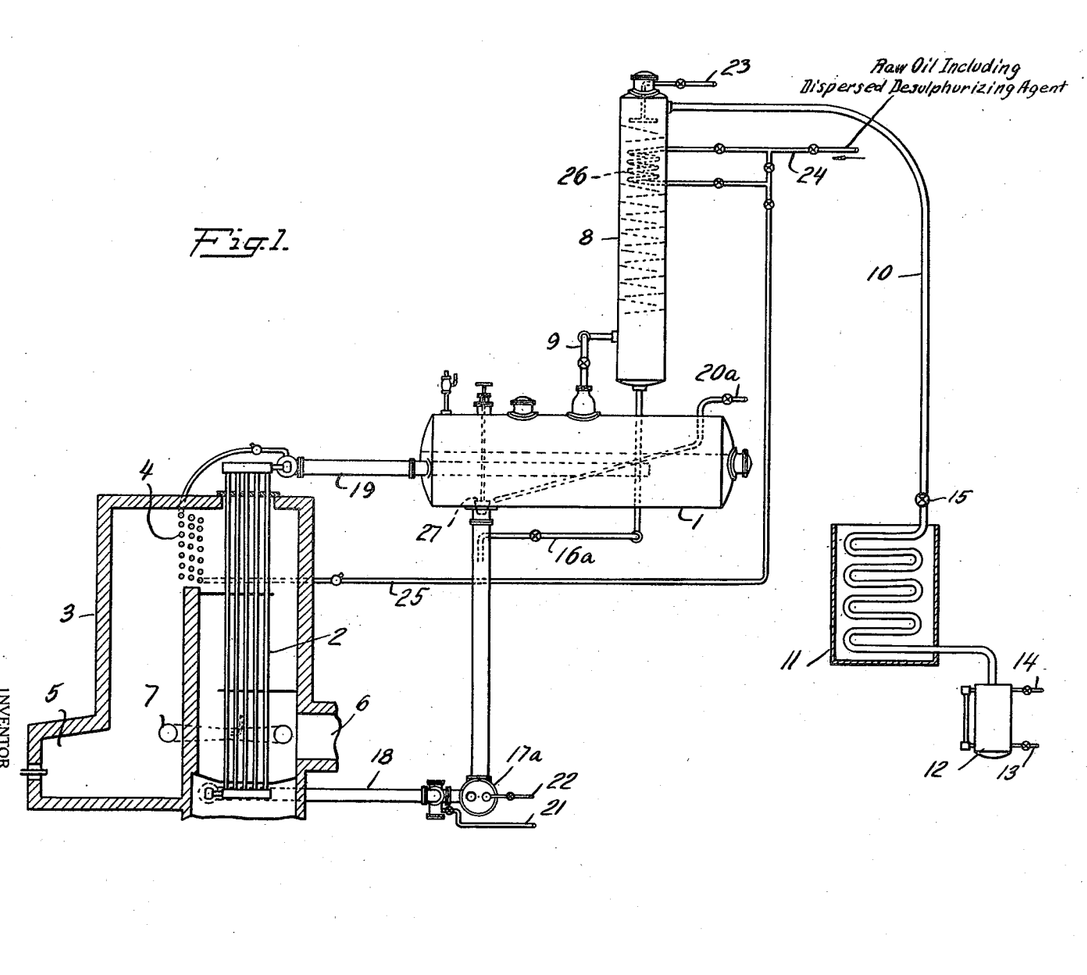
Fig. 1 represents a pressure still system adapted for carrying out the invention.
Figure 2:
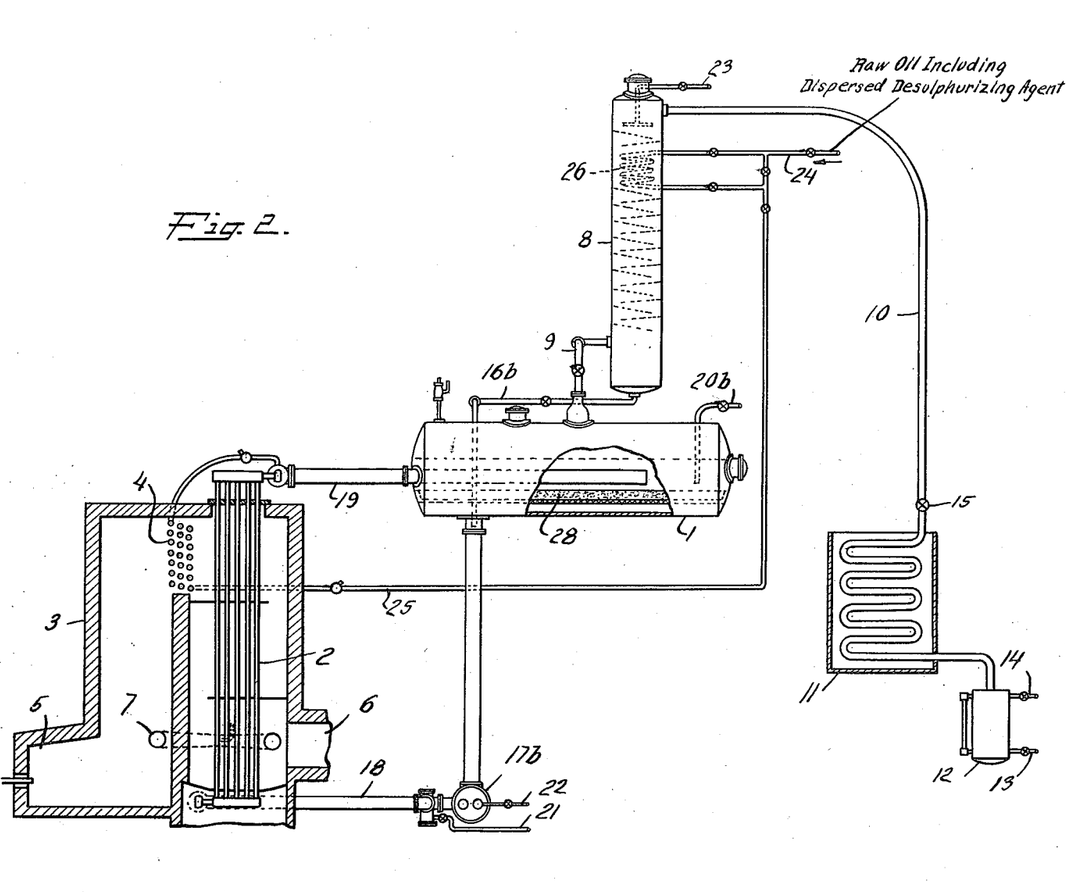
Fig. 2 represents a modified pressure still system adapted for carrying out the invention.

Referring more particularly to Figs. 1 and 2, a reflux tower 8 is arranged above the vaporizing drum 1. Vapors escape from the vaporizing drum 1 to the lower end of the reflux tower 8 through vapor line 9 and vapors remaining uncondensed escape from the upper end of the reflux tower 8 through vapor line 10 to condenser 11. This condenser is arranged to discharge into a receiver 12 from which the distillate product of the operation is discharged through connection 13, uncondensed vapors and gases escaping through connection 14. The pressure in the system may be maintained and regulated by means of valve 15 in the vapor line 10 between the reflux tower 8 and the condenser 11 or by means of suitable valves arranged beyond the condenser or receiver. Reflux condensate from the lower end of the reflux tower 8 is discharged, through connection 16a in Fig. 1 and through connection 16b in Fig. 2, to a circulating pump, 17a in Fig. 1 and 17b in Fig. 2, which then forces this oil mixture through connection 18 upwardly through the heating tubes 2 through connection 19 to the vaporizing drum 1. This oil mixture is heated to a cracking temperature in the heating tubes 2. The particular type of circulating pump illustrated, 17a in Fig. 1 and 17b in Fig. 2, is described in more detail in an application filed June 17, 1927, Serial No. 197,209 by Thomas de C. Tifft.

A tar line, 20a in Fig. 1 and 20b in Fig. 2, is provided for discharging unvaporized oil from the vaporizing drum 1 during operation. Connection 21 is provided for initially charging the still and for pumping out the still at the end of a run. Connection 22 is provided for supplying cooling oil to the bearings of the circulating pump. Connection 23 is provided for introducing raw oil into the upper end of the reflux tower 8 in direct contact with the vapors therein, for example for effecting or controlling the refluxing operation therein. Connections 24 and 25 are provided for supplying the raw oil including a dispersed desulphurizing agent to the heating tubes 4. This raw oil, or part of this raw oil, by means of the valves shown, may be circulated through the coil 26 in indirect heat exchanging relation with the vapors in the reflux tower 8, for example for preheating this raw oil or for effecting or controlling the refluxing operation.

Referring more particularly to Fig. 1, the provision of a closure valve 27 in a pressure still of the type illustrated, and the particular type of closure valve illustrated, is described in more detail in an application filed January 12, 1928, Serial No. 246,263, by Eugene C. Herthel. This closure valve 27 is used for bringing this still into operation. To bring the pressure still illustrated in Fig. 1 to operating conditions of temperature and pressure, the still is charged with enough oil to fill the drum 1, say, one-third full, pump 17a is started to maintain circulation of the oil charge from the drum 1 through the heating tubes 2 back to the drum 1, oil is forced, through connections 24 and 25, through the heating tubes 4 into the drum 1, fires are started in the heating furnace 3, drips are taken off, valve 15 is then closed until the desired operating pressure is reached, valve 27 is then closed very gradually and valve 15 is gradually opened and regulated to maintain the desired operating pressure, any excess oil accumulating in the drum 1 during this period being discharged through connection 20a.

Referring more particularly to Fig. 2, the provision of a bed 28 of filtering or absorbent or desulphurizing material in a pressure still of the type illustrated is described in more detail in United States Letters Patent No. 1,634,666, granted July 5, 1927, to the Sinclair Refining Company on an application of myself and Eugene C. Herthel.

In the type of pressure still illustrated in Fig. 1, the oil passed through the secondary heating zone, the battery of heating tubes 2, consists exclusively, during regular operation, of higher boiling constituents condensed in the reflux tower 8 from the vapors taken off from the vaporizing drum 1 or a mixture of higher boiling constituents so condensed and raw oil supplied through connection 23. In the type of pressure still illustrated in Fig. 2, the oil passed through the secondary heating zone, the battery of heating tubes 2, includes unvaporized oil from the vaporizing drum 1 which has passed through the bed 28 of filtering or absorbent or desulphurizing material and has so been freed from suspended matter.

The pressure still illustrated in Fig. 2 is brought to operating conditions of temperature and pressure in the manner described in United States Letters Patent No. 1,634,666 mentioned above, oil also being forced through the heating tubes 4 during the bringing up period. To accommodate this additional supply of oil, the initial charge of oil may be somewhat reduced and any excess oil accumulating in the vaporizing drum 1 during this period of operation may be discharged through connection 20b.

For the production of gasoline from gas oil, for example, pressures in the neighborhood of 90–125 pounds per square inch may be employed, or higher pressures up to 300 pounds per square inch or more may be employed. In general, higher pressures are employed with lower boiling charging stocks or to produce lower boiling distillate products. In any particular case the temperature will be determined by the pressure used.

The initial charge of oil may consist of the same stock to be supplied during operation or, particularly if the stock to be supplied during operation contains a large amount of objectionable sulphur, the initial charge may consist of some other stock containing a relatively small amount of objectionable sulphur or, if the stock to be supplied during operation is a crude or topped crude or fuel oil or contains a large amount of tarry or pitchy constituents, the initial charge may consist of a clean gas oil stock. Similar stocks or different stocks may be supplied to the battery of heating tubes making up the primary heating zone and to the battery of heating tubes making up the secondary heating zone and the vaporizing drum during the initial period of operation. The stocks supplied to the primary heating zone and the vaporizing drum during the initial period of operation may be selected on the principles just outlined.

In carrying out the invention in the pressure still illustrated, either in Fig. 1 or in Fig. 2, after the still system has been brought to operating conditions of temperature and pressure, the raw sulphur-containing stock with a desulphurizing agent dispersed therein is forced through the heating tubes 4 into the vaporizing drum 1. For example, from ¼ to 4 pounds of hydrated lime may be dispersed in each barrel (42 gallons) of the raw sulphur-containing stock supplied to the heating tubes 4. Vapors including vapors of the desired distillate product and vapors of constituents higher boiling than suitable as components of the desired distillate product are taken off from the vaporizing drum 1 under superatmospheric pressure to the reflux tower 8 in which higher boiling constituents are condensed. This condensation may be effected or controlled, for example, by the circulation of the raw sulphur-containing stock on its way to the heating tubes 4, or part of this stock, through the coil 26 or by the introduction of raw oil through connection 23 or by both of these means conjointly. The condensate from the reflux tower 8, together with any admixed unvaporized raw oil supplied through connection 23, is circulated through the heating tubes 2 back to the vaporizing drum 1. In the pressure still illustrated in Fig. 1, the oil circulated through the heating tubes 2 consists exclusively either of reflux condensate or of a mixture of reflux condensate and raw oil, this oil being free from suspended matter such as reaction products of the desulphurization or unconsumed desulphurizing agent or pitch or pitch-like solids or semi-solids formed by the cracking reaction. In the pressure still illustrated in Fig. 2, the oil circulated through the heating tubes 2 includes unvaporized oil from the vaporizing drum 1, but only unvaporized oil which has passed through the bed 28 of filtering or absorbent or desulphurizing material and which has by this passage been freed from suspended matter. In the pressure still illustrated either in Fig. 1 or in Fig. 2, the residue including higher boiling constituents of the raw sulphur-containing stock suplied to the still, particularly where this stock is a crude or topped crude or fuel oil, and solid or semi-solid reaction products of the desulphurization reaction or the cracking reaction and any unconsumed desulphurizing agent is discharged, through connection 20a in Fig. 1 and through connection 20b in Fig. 2, without permitting circulation of any part of this residue through either heating zone. In the pressure still illustrated in Fig. 1, no unvaporized oil from the vaporizing drum 1 is permitted to circulate, during regular operation, through either heating zone. The oil passing through the heating tubes 2 is heated to a cracking temperature therein. The oil passing through the heating tubes 4 is, with advantage, heated approximately to the temperature prevailing in the vaporizing drum 1 or to a higher temperature, and the temperature to which this oil is heated in the heating tubes 4 is, with advantage, a cracking temperature. The condensing operation effected in the reflux tower 8 is regulated to condense all constituents of the vapors passing therethrough higher boiling than suitable as components of the desired distillate product and suitable to be supplied to the secondary heating zone to be heated to a cracking temperature therein. For the production of a gasoline-containing distillate, for example, the refluxing operation may be regulated so that the temperature of the vapors escaping through vapor line 10 as they leave the upper end of the reflux tower 8 is in the neighborhood of 500–585° F. where the system is operated under a pressure in the neighborhood of 125 pounds per square inch. Where raw oil is supplied through connection 23 during regular operation, the oil so supplied, for example, may be a clean gas oil stock or a stock sufficiently free from objectionable sulphur compounds to permit its intrduction in this manner without involving difficulties due to corrosion.

In describing the apparatus illustrated in Figs. 3 to 7, any parts not specifically described in connection with these figures will be designated by the same reference numeral as the corresponding part in Figs. 1 and 2 and the description of that part and of its relation to the still system may be taken as the same as for the corresponding part in Figs. 1 and 2.

Figure 3:
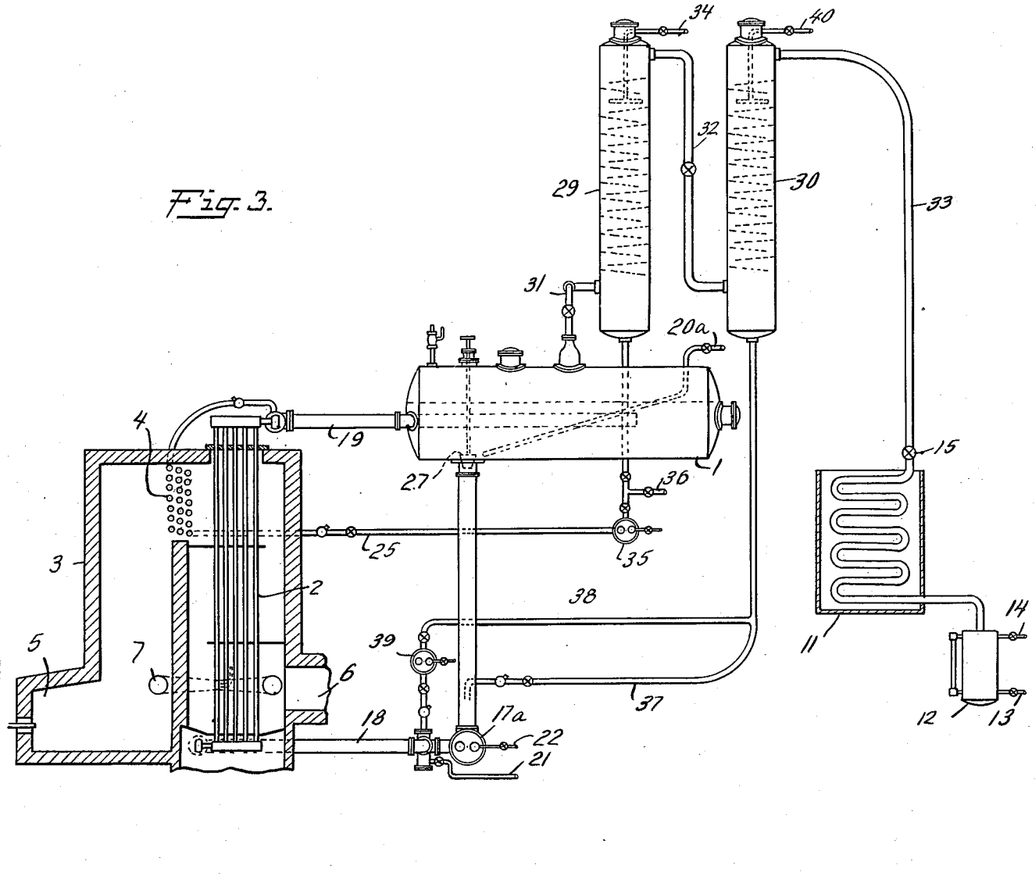
Figs. 3 and 4 represent further modified pressure still systems, corresponding to Figs. 1 and 2 respectively, adapted for carrying out the invention.
Figure 4:
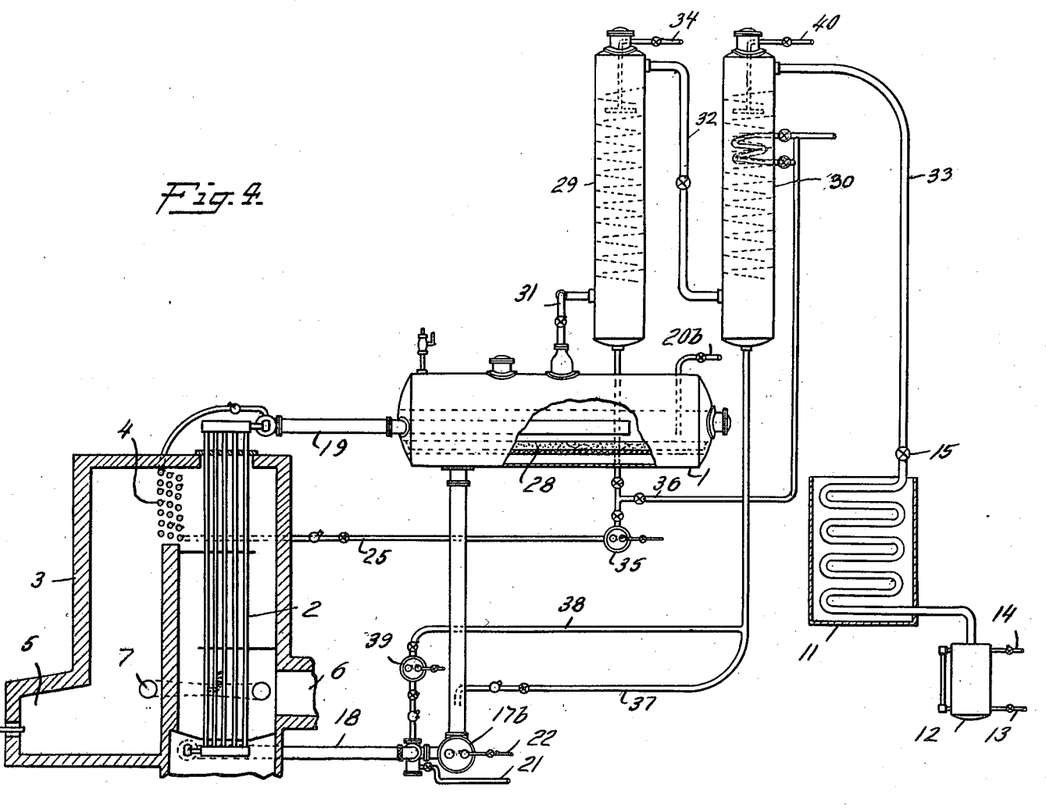

Referring more particularly to Figs. 3 and 4, a pair of reflux towers 29 and 30 are arranged above the vaporizing drum 1. Vapors escape from the vaporizing drum 1 to the lower end of the reflux tower 29 through vapor line 31, from the upper end of the reflux tower 29 to the lower end of the reflux tower 30 through vapor line 32 and from the upper end of the reflux tower 30 through vapor line 33, to condenser 11 as previously described in connection with Figs. 1 and 2. The raw oil including a dispersed desulphurizing agent is introduced into the upper end of reflux tower 29 in direct contact with the vapors therein through connection 34 and this raw oil together with higher boiling constituents condensed in the reflux tower 29 is forced, by means of pump 35, to and through the heating tubes 4, through connection 25. Part of the raw oil including a dispersed desulphurizing agent may be supplied directly to the heating tubes 4 through connection 36. The particular type of pump illustrated, designated 35, and also the pump designated 39, is described in more detail in application Serial No. 197,209 mentioned above. The raw oil including a dispersed desulphurizing agent supplied to the heating tubes 4 either through connection 34 or through connection 36 may first be preheated, or partially preheated, by indirect heat exchange with the vapors in reflux tower 30. In the reflux tower 30, constituents higher boiling than suitable as components of the desired distillate product and suitable to be supplied to the heating tubes 2 to be heated to a cracking temperature therein are condensed and supplied to the heating tubes 2 either through connection 37 by means of pump 17a in Fig. 3 or by means of pump 17b in Fig. 4 or through connection 38 by means of pump 39. For effecting or controlling the refluxing operation in reflux tower 30, for example, raw oil less objectionable with respect to corrosion may be supplied through connection 40 and introduced into the upper end of the reflux tower 30 in direct contact with the vapors therein. Any unvaporized raw oil so introduced into reflux tower 30 is supplied to the heating tubes 2 together with the condensate from the reflux tower 30 either through connection 37 or through connection 38. This operation is advantageous particularly where the raw stock containing objectionable sulphur compounds is relatively more refractory.

Figure 5:
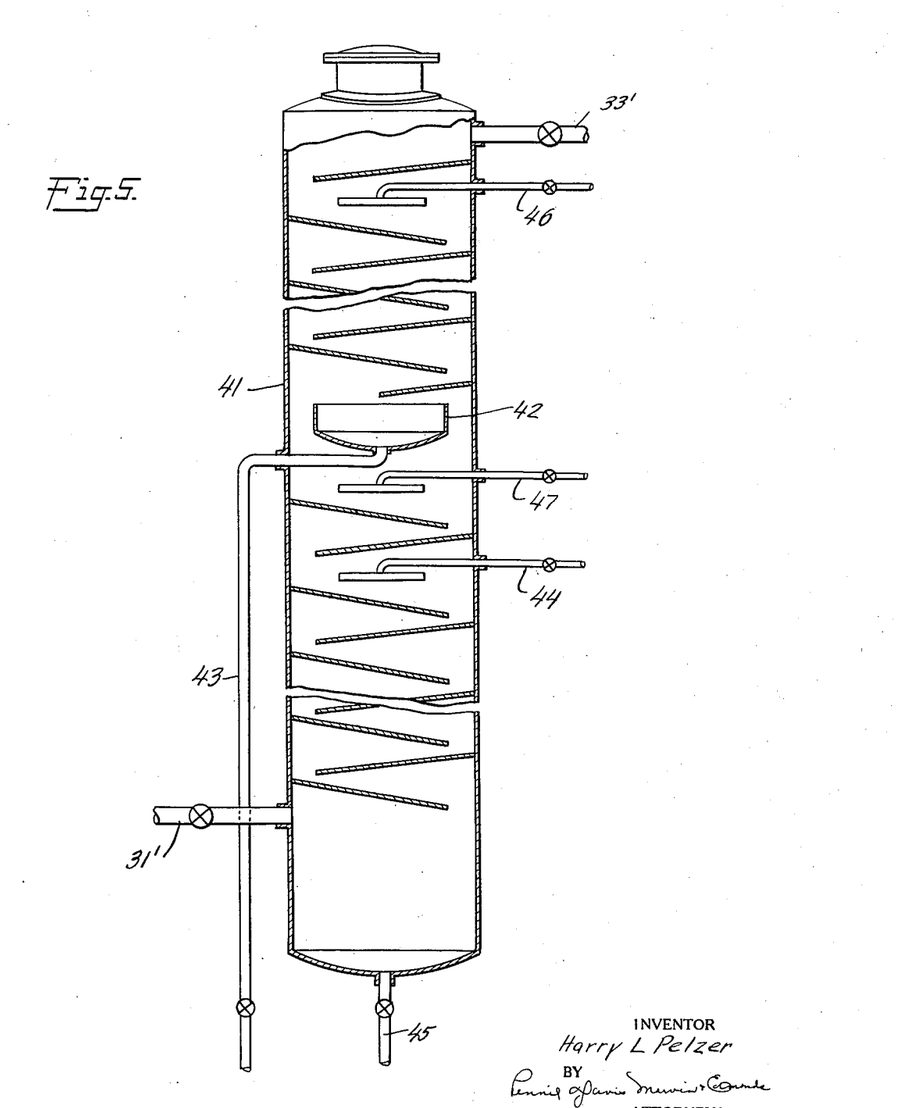
Fig. 5 is an enlarged but fragmentary representation of a divided reflux tower.

Instead of using a pair of reflux towers as illustrated in Figs. 3 and 4, a single divided tower may be used. Referring to Fig. 5, for example, the vapor line 31 from the vaporizing drum 1 may connect to the lower end of the reflux tower 41 through connection 31', the vapor line 33 may connect to the upper end of this reflux tower through connection 33', condensate from the upper part of this tower may be withdrawn by means of pan 42 and supplied to pump 17a or pump 39 through connection 43, the raw oil including a dispersed desulphurizing agent may be introduced into the lower part of this tower through connection 44 and condensate from the lower part of this tower together with unvaporized raw oil supplied to pump 35 through connection 45. The refluxing operation in the upper part of the reflux tower 41 may be effected or controlled, for example, by the regulated introduction of a refluxing medium through connection 46, and the refluxing operation in the lower part of this tower effected by the introduction of raw oil through connection 44 may be supplemented or controlled by the regulated introduction of another refluxing medium through connection 47. Raw oil less objectionable with respect to corrosion, a clean gas oil for example, may be supplied through connections 46 or 47 or both of these connections as a refluxing medium or a stock vaporizing substantially completely under the conditions of temperature and pressure prevailing in the reflux tower, a part of the distillate product, for example, may be supplied through connections 46 or 47 or both of these connections as a refluxing medium. It is sometimes advantageous to supply raw oil to be subjected to the cracking operation through connection 47 as a refluxing medium and to supply a stock vaporizing substantially completely under the prevailing conditions of temperature and pressure through connection 46 as a refluxing medium.

Figure 6:
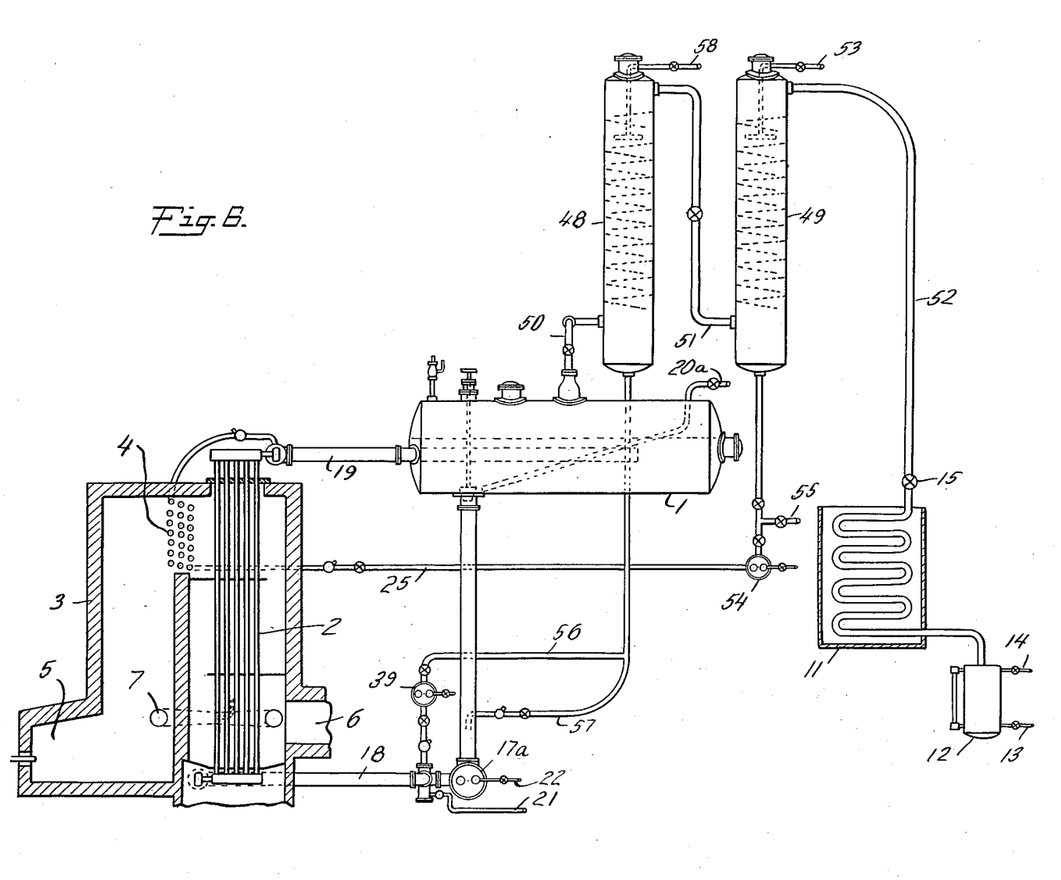
Figs. 6 and 7 represent further modified pressure still systems, correponding to Figs. 1 and 2 respectively, adapted for carrying out the invention.
Figure 7:
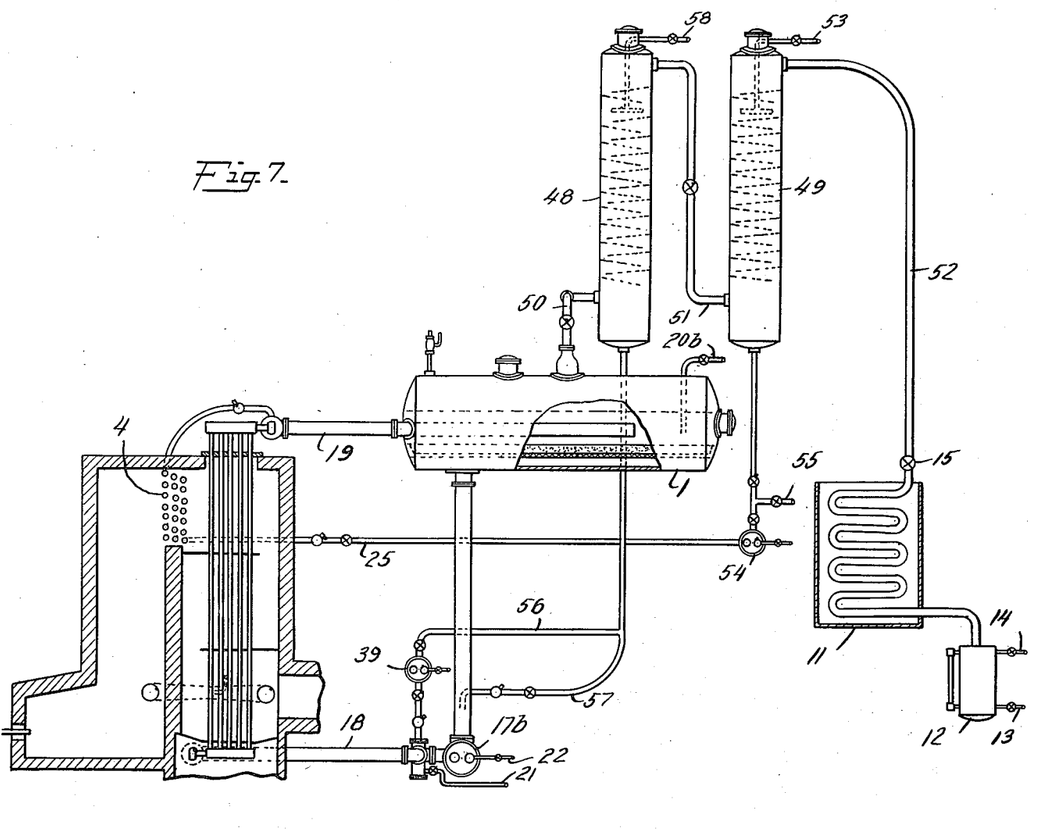

Referring more particularly to Figs. 6 and 7, a pair of reflux towers 48 and 49 are arranged above the vaporizing drum 1. Vapors escape from the vaporizing drum 1 to the lower end of the reflux tower 48 through vapor line 50, from the upper end of the reflux tower 48 to the lower end of the reflux tower 49 through vapor line 51 and from the upper end of the reflux tower 49 through vapor line 52 to the condenser 11. The raw oil including a dispersed desulphurizing agent is introduced into the upper end of the reflux tower 49 in direct contact with the vapors therein through connection 53, and this raw oil together with higher boiling constituents condensed in the reflux tower 49 is forced, by means of pump 54, to and through the heating tubes 4, through connection 25. Part of the raw oil including a dispersed desulphurizing agent may be supplied directly to the heating tubes 4 through connection 55. The particular type of pump illustrated designated 54 is described in more detail in application Serial No. 197,209 mentioned above. In the reflux tower 48, higher boiling constituents are condensed and supplied to the heating tubes 2 either through connection 56 by means of pump 39 or through connection 57 by means of pump 17a in Fig. 6 and 17b in Fig. 7. For effecting or controlling the refluxing operation in reflux tower 48, raw oil less objectionable with respect to corrosion may be supplied through connection 58 and introduced into the upper end of the reflux tower 48 in direct contact with the vapors therein. Any unvaporized raw oil so introduced into the reflux tower 48 is supplied to the heating tubes 2 together with the condensate from the reflux tower 48 either through connection 56 or through connection 57. This operation is advantageous particularly where the raw stock containing objectionable sulphur compounds is relatively less refractory.

Instead of using a pair of reflux towers as illustrated in Figs. 6 and 7 a single divided reflux tower may be used. A reflux tower of the type illustrated in Fig. 5, with appropriate connections to the rest of the still system, for example, may be so used.

In carrying out the invention, the raw oil supplied to the operation including a dispersed desulphurizing agent, that is the raw oil supplied to the operation more objectionable with respect to corrosion, is heated to a high temperature while including the dispersed desulphurizing agent in the primary heating zone. By maintaining a relatively high velocity of flow through the primary heating zone, however, deposition within the heating zone of the desulphurizing agent or of reaction products of desulphurization or reaction products of any cracking taking place in the primary heating zone is avoided or minimized, and solid or semi-solid reaction products of the desulphurization or of the cracking are not permitted again to pass through either the primary heating zone or the secondary heating zone. Similarly, any excess desulphurizing agent is not permitted again to pas through either the primary heating zone or the secondary heating zone. In the vaporizing zone, particularly when a substantial body of liquid is there maintained, further reaction between the oil or the sulphur compounds of the oil and the desulphurizing agent may be effected. Lower boiling components of the oil mixture discharged from the primary heating zone may escape at once to form a part of the distillate product. Higher boiling components of this oil mixture, vaporized in the vaporizing drum, are condensed and returned to the secondary heating zone, so forming part of the circulating still charge. Where the primary heating zone, through which the oil including a dispersed desulphurizing agent is passed, is heated by the same stream of heating gases as the secondary heating zone and where this stream of heating gases passes first in heat exchange with the oil passing through the primary heating zone and then in heat exchange with the oil passing through the secondary heating zone, the raw oil including a dispersed desulphurizing agent is subjected to the most severe conditions maintained in the heating furnace, thus maintaining the raw oil more objectionable with respect to corrosion in intimate contact with the desulphurizing agent used through that part of the still system in which the sulphur compounds present in the oil are most reactive, that is in the region of highest temperature. Corrosion difficulties seem to be more severe on surfaces in contact with oil vapors than on surfaces in contact with liquid oil, at the same temperature. This invention, however, subjects the raw oil more objectionable with respect to corrosion to intimate contact at high temperature with the desulphurizing agent before this raw oil, or any components of this raw oil, reaches the vapor space in the vaporizing zone. By preheating the raw oil including a dispersed desulphurizing agent, this raw oil is maintained in contact with the desulphurizing agent at elevated temperature for a prolonged period and for a period preceding passage through the primary heating zone. The operation of the invention is intermittent in that the still system must be shut down for cleaning at more or less regular intervals and, in the case of still systems using a bed of filtering or absorbent or desulphurizing material, for removal and replacing of the filtering or absorbent or desulphurizing material. A large part of the solid or semi-solid products of the desulphurizing reaction and of the cracking reaction, as well as any excess desulphurizing agent, however, may be discharged in suspension in residual oil discharged through the tar line during regular operation.

Referring to the apparatus illustrated, the vaporizing drum 1, the reflux tower 8 or the reflux towers 29 and 30 or the reflux towers 48 and 49, the connections 18 and 19, and the connections for returning reflux condensates to the heating zones are with advantage lagged or thermally insulated.

In each of the pressure stills illustrated, heat is supplied to both heating zones by the same stream of heating gases. In this respect the apparatus illustrated is a particularly advantageous embodiment of the invention. The heating tubes making up the primary heating zone may, however, be arranged in and heated in a heating furnace separate from the heating furnace in which the heating tubes making up the secondary heating zone are arranged and heated.

The residual oil discharged from the vaporizing zone during operation may be subjected to further distillation for the further separation of oil constituents. This distillation may, for example, be effected, or in part effected, by reduction of the pressure on the discharged oil.

The character of the desulphurizing agent used permitting, the residue including any unconsumed desulphurizing agent and any heavy products of the desulphurization discharged from the vaporizing zone may be subjected to treatment for recovery of the desulphurizing agent. Where cupriferous desulphurizing agents are used, for example, the residue discharged from the vaporizing zone, either before or after distillation therefrom of lower boiling oil constituents, may be cooled and the cooled residue permitted to settle or subjected to a filtering operation for the separation of the metallic values and this separated material roasted or otherwise treated to render it again active to be reused in the process. In general, where lime is used, for example, any unconsumed desulphurizing agent and any heavy products of the desulphurization may be separated from the discharged residue by settling or filtration after cooling.

I claim:

1. In cracking sulphur-containing hydrocarbon oils by distillation under superatmospheric pressure, the improvement which comprises passing raw oil including a dispersed desulphurizing agent through a primary heating zone into a vaporizing zone in a pressure still, circulating oil free from suspended matter from the vaporizing zone through a secondary heating zone back to the vaporizing zone, passing heating gases first in heat exchange with the oil passing through the primary heating zone and then in heat exchange with the oil passing through the secondary heating zone and thereby heating the oil passing through both heating zones to a cracking temperature, and taking off vapors including vapors of the desired distillate product from the vaporizing zone under superatmospheric pressure.

2. In cracking sulphur-containing hydrocarbon oils by distillation under superatmospheric pressure, the improvement which comprises passing raw oil including a dispersed desulphurizing agent through a primary heating zone into a vaporizing zone in a pressure still, circulating oil free from suspended matter from the vaporizing zone through a secondary heating zone back to the vaporizing zone, heating the oil passing through both heating zones to a cracking temperature, and taking off vapors including vapors of the desired distillate product from the vaporizing zone under superatmospheric pressure.

3. In cracking sulphur-containing hydrocarbon oils by distillation under superatmospheric pressure, the improvement which comprises passing raw oil including a dispersed desulphurizing agent through a primary heating zone into a vaporizing zone in a pressure still, circulating oil free from suspended matter from the vaporizing zone through a secondary heating zone back to the vaporizing zone, heating the oil passing through the secondary heating zone to a cracking temperature and heating the oil passing through the primary heating zone to a temperature not substantially less than that prevailing in the vaporizing zone, and taking off vapors including vapors of the desired distillate product from the vaporizing zone under superatmospheric pressure.

4. In cracking sulphur-containing hydrocarbon oils by distillation under superatmospheric pressure, the improvement which comprises passing raw oil including a dispersed desulphurizing agent through a primary heating zone into a vaporizing zone in a pressure still, circulating oil free from suspended matter from the vaporizing zone through a secondary heating zone back to the vaporizing zone, passing heating gases first in heat exchange with the oil passing through the primary heating zone and then in heat exchange with the oil passing through the secondary heating zone and thereby heating the oil passing through the secondary heating zone to a cracking temperature and heating the oil passing through the primary heating zone to a temperature not substantially less than that prevailing in the vaporizing zone, and taking off vapors including vapors of the desired distillate product from the vaporizing zone under superatmospheric pressure.

5. In cracking sulphur-containing hydrocarbon oils by distillation under superatmospheric pressure, the improvement which comprises passing raw oil including a dispersed desulphurizing agent through a primary heating zone into a vaporizing zone in a pressure still, circulating oil free from suspended matter from the vaporizing zone through a secondary heating zone back to the vaporizing zone, passing heating gases first in heat exchange with the oil passing through the primary heating zone and then in heat exchange with the oil passing through the secondary heating zone and thereby heating the oil passing through both heating zones to a cracking temperature, taking off vapors from the vaporizing zone under superatmospheric pressure and subjecting them to a refluxing operation, circulating reflux condensate from the refluxing operation through the secondary heating zone, and taking off vapors including vapors of the desired distillate product from the refluxing operation.

6. In cracking sulphur-containing hydrocarbon oils by distillation under superatmospheric pressure, the improvement which comprises passing raw oil including a dispersed desulphurizing agent through a primary heating zone into a vaporizing zone in a pressure still, taking off vapors from the vaporizing zone under superatmospheric pressure and subjecting them to a refluxing operation, passing raw oil including a dispersed desulphurizing agent on its way to the primary heating zone in heat exchanging relation with the vapors in the refluxing operation, circulating oil free from suspended matter from the vaporizing zone through a secondary heating zone back to the vaporizing zone, heating the oil passing through both heating zones to a cracking temperature, and taking off vapors including vapors of the desired distillate product from the refluxing operation.

7. In cracking sulphur-containing hydrocarbon oils by distillation under superatmospheric pressure, the improvement which comprises passing raw oil including a dispersed desulphurizing agent through a primary heating zone into a vaporizing zone in a pressure still, taking off vapors from the vaporizing zone under superatmospheric pressure and subjecting them to a refluxing operation, passing raw oil including a dispersed desulphurizing agent on its way to the primary heating zone in indirect heat exchanging relation with the vapors in the refluxing operation, circulating reflux condensate from the refluxing operation free from suspended matter through a separate secondary heating zone back to the vaporizing zone, heating the oil passing through both heating zones to a cracking temperature, and taking off vapors including vapors of the desired distillate product from the refluxing operation.

8. In cracking sulphur-containing hydrocarbon oils by distillation under superatmospheric pressure, the improvement which comprises preheating raw oil including a dispersed desulphurizing agent and passing the preheated raw oil including a dispersed desulphurizing agent through a primary heating zone into a vaporizing zone in a pressure still, circulating oil free from suspended matter from the vaporizing zone through a secondary heating zone back to the vaporizing zone, heating the oil passing through both heating zones to a cracking temperature, and taking off vapors including vapors of the desired distillate product from the vaporizing zone under superatmospheric pressure.

9. In cracking sulphur-containing hydrocarbon oils by distillation under superatmospheric pressure, the improvement which comprises passing raw oil including a dispersed desulphurizing agent through a primary heating zone into a vaporizing zone in a pressure still, taking off vapors from the vaporizing zone under superatmospheric pressure and subjecting them successively to two refluxing operations, passing raw oil including a dispersed desulphurizing agent on its way to the primary heating zone in heat exchanging relation with the vapors in the first refluxing operation and supplying reflux condensate from the first refluxing operation to the primary heating zone, circulating reflux condensate from the second refluxing operation free from suspended matter through a secondary heating zone back to the vaporizing zone, heating the oil passing through both heating zones to a cracking temperature, and taking off vapors including the vapors of the desired distillate product from the second refluxing operation.

10. In cracking sulphur-containing hydrocarbon oils by distillation under superatmospheric pressure, the improvement which comprises passing raw oil including a dispersed desulphurizing agent through a primary heating zone at higher velocity into a vaporizing zone in a pressure still, circulating oil free from suspended matter from the vaporizing zone through a secondary heating zone at lower velocity back to the vaporizing zone, passing heating gases first in heat exchange with the oil passing through the primary heating zone and then in heat exchange with the oil passing through the secondary heating zone and thereby heating the oil passing through both heating zones to a cracking temperature, and taking off vapors including vapors of the desired distillate product from the vaporizing zone under superatmospheric pressure.

HARRY L. PELZER.